United States Patent
Chahal

(10) Patent No.: US 7,386,103 B1
(45) Date of Patent: Jun. 10, 2008

(54) METHOD AND SYSTEM FOR PROVIDING PROMPT NAVIGATION IN INTERACTIVE VOICE RESPONSE (IVR) SYSTEM

(75) Inventor: Taminder S. Chahal, Hoffman Estates, IL (US)

(73) Assignee: 3Com Corporation, Marlborough, MA (US)

( * ) Notice: Subject to any disclaimer, the term of this patent is extended or adjusted under 35 U.S.C. 154(b) by 603 days.

(21) Appl. No.: 11/014,099

(22) Filed: Dec. 14, 2004

(51) Int. Cl.
*H04M 1/64* (2006.01)
(52) U.S. Cl. ...................... 379/88.23; 379/76
(58) Field of Classification Search ............ 379/88.25, 379/88.23, 88.17, 88.16, 71, 76, 67.1
See application file for complete search history.

(56) References Cited

U.S. PATENT DOCUMENTS

| | | | |
|---|---|---|---|
| 5,864,605 A * | 1/1999 | Keshav ................. | 379/88.01 |
| 6,370,238 B1 * | 4/2002 | Sansone et al. .......... | 379/88.23 |
| 6,654,447 B1 * | 11/2003 | Dewan ..................... | 379/76 |
| 6,782,089 B1 * | 8/2004 | Blackburn et al. ..... | 379/212.01 |
| 6,829,334 B1 * | 12/2004 | Zirngibl et al. .......... | 379/88.17 |
| 6,985,865 B1 * | 1/2006 | Packingham et al. ..... | 704/275 |
| 7,065,188 B1 * | 6/2006 | Mei et al. ................ | 379/88.23 |
| 7,158,936 B2 * | 1/2007 | Denenberg et al. ...... | 704/270.1 |

* cited by examiner

*Primary Examiner*—Olisa Anwah

(57) ABSTRACT

Method and system for navigating in an interactive voice response system including detecting an account login request, authenticating the login request, detecting a location identifier request, and generating a location identifier in response to the location identifier request is provided. Also, the method and system includes detecting an account login request, authenticating the login request, receiving a location identifier, and bypassing one or more menu hierarchy in an interactive navigation system to transfer the user associated with the account login request to a location in the menu hierarchy associated with the location identifier.

7 Claims, 7 Drawing Sheets

METHOD AND SYSTEM FOR PROVIDING PROMPT NAVIGATION IN INTERACTIVE VOICE RESPONSE (IVR) SYSTEM

FIELD OF THE INVENTION

The present invention relates to interactive voice response (IVR) systems. More specifically, the present invention relates to method and system for providing prompt navigation in interactive voice response systems.

BACKGROUND

User interaction based telephone systems rely upon automated systems to provide user navigation. For example, consumer oriented service providers and vendors such as insurance companies, credit card companies rely on the policy or account holders to call into the company telephone system to perform various transactions such as providing account information, payment information, and other account management options. For example, there exists presently interactive voice responsive systems by service providers that provide the account holders with a toll free telephone number or a local telephone number for the user to call in to provide the desired information to the account holders.

In this manner, the service providers and vendors are able lower the overhead associated with maintaining call centers and support personnel to directly interact with their customers. Indeed, by having a well structured interactive voice response systems, vendors and service providers are able to substantially eliminate costs associated with providing consumer support.

FIG. 2 is a flowchart illustrating a caller interaction with an IVR system using a telephone call. Referring to the Figure, at step 201, the IVR system detects and receives a user or account holder telephone call into the IVR system. This step may include a standard telephone call using a POTS line or using a broadband connection with Voice over IP capability. Typically, the telephone number is provided to the user by the service provider or vendor at the time the corresponding account for the user is opened by the user, and which is generally given as the number to call for customer support.

Referring again to the Figure, at step 202. the IVR system performs user authentication procedure. This step generally requires the IVR system to prompt the user to enter the user's account identification number and a corresponding password associated with the account. Upon successful entry by the user using the telephone key pads (or provided verbally if the IVR system is equipped with voice recognition option), the user navigation of the IVR system begins at step 203 by first, providing the user with a list of options for locating the user's intended transaction. For example, at step 203, the IVR system may provide the user with a list of options and the corresponding entry associated with the telephone key pad for user selection, and subsequent to the user selection option, the IVR system may provide a set of additional options to the user, again prompting the user to make a selection and to enter that using the user's telephone key pad.

In this manner, using the telephone key pad as the input terminal, the user, following the instructions from the IVR system, navigates the IVR system to reach the desired location in the IVR system to perform the intended transaction (e.g., payment transaction, account balance inquiry transaction).

Referring again to FIG. 2, at step 204, at the end of each subroutine or selection of an option by the user, the IVR system prompts the user to select, as one of the options, an entry (for example, "pressing the "*" key on the telephone key pad), to inform the IVR system that the user has completed the desired transaction. If at step 204 the IVR system receives the prompt associated with completed user transaction, then at step 205, the IVR system notifies the user that the transaction is completed, optionally provides a reference number associated with the transaction to the user, and terminates the telephone call. However, if at step 204, the user prompt indicates that the user transaction is not complete, then the routine returns to step 203 to allow the user to continue navigation through the IVR system.

The IVR system generally resident at the vendor site interacts with the CRM database to retrieve and store information associated with the user navigation of the IVR system and the associated transaction.

However, for the account holders and consumers, navigating through the interactive voice response systems can be frustrating, and even unsuccessful at times. This is mainly due to the interactive voice response system requiring the account holders to follow a set number of steps or procedures to reach the location in the interactive voice response system that corresponds to the account holder's desired transaction. For example, if the account holder calls into the interactive voice response system to check account balance, the interactive voice response system prompts the account holder to enter various key inputs using the account holder's telephone in order to verify the account holder, the proper account associated with the account holder, and the transaction that the account holder intends to perform in that specific call. If the account holder wants to perform a payment transaction associated with the account, the navigation through the interactive voice response system may include a different set of key entries prompted to the account holder for entry by the system. Further, if the telephone call drops during the navigation procedure by the account holder, the account holder may have to call in again and repeat the navigation procedure from the beginning to reach the intended transaction.

Indeed, it can be seen that the navigation through the interactive voice response system may be time consuming and frustrating for the account holder.

Therefore, it would be desirable to have a method and a system which allows easy and efficient navigation through an interactive voice response system for performing the desired transactions.

SUMMARY OF THE INVENTION

In view of the foregoing, in accordance with one embodiment of the present invention, there is provided a method of navigating in an interactive voice response system, the method comprising the steps of detecting an account login request, authenticating the login request, detecting a location identifier request, and generating a location identifier in response to the location identifier request.

The authenticating step may also include the steps of receiving a user account information, and comparing the received user account information to a corresponding account information associated with the account.

The user account may include at least a user identification information and a password corresponding to the account.

The step of generating a location identifier may include the steps of associating a corresponding location within an interactive navigation system to the location identifier, and storing the location identifier.

The interactive navigation system in one embodiment may include an interactive voice response system.

The method may further include the step of transmitting the location identifier to the user.

In a further embodiment, the method may also include the steps of receiving the location identifier, and directly placing the user at the location of the navigation system corresponding to the location identifier.

A method of navigating in an interactive voice response system in accordance with another embodiment of the present invention includes the steps of detecting an account login request, authenticating the login request, receiving a location identifier, and bypassing one or more menu hierarchy in an interactive navigation system to transfer the user associated with the account login request to a location in the menu hierarchy associated with the location identifier.

The bypassing step may in one embodiment include the steps of retrieving a location identifier information associated with the received location identifier, and transferring the call associated with the authenticated login request to the location within the interactive navigation system corresponding to the retrieved location identifier information.

The authenticating step may include the steps of receiving a user account information, and comparing the received user account information to a corresponding account information associated with the account.

In one embodiment, the user account information may include at least a user identification information and a password corresponding to the account, an account number information, a social security number information, a billing address information, a payment information (including credit card information, a bank routing number information), a payment history information, a user demographic information, and a user profile information, all of which are associated with the account, and stored, for example, in a CRM database.

Moreover, the interactive navigation system may include an interactive voice response system.

Furthermore, in an additional embodiment, the interactive voice response system is voice recognition enabled.

A method of navigating in an interactive voice response system in accordance with yet another embodiment of the present invention includes the steps of detecting an account login request, receiving a location identifier, performing account login authentication based on the received location identifier, and bypassing one or more menu hierarchy in an interactive navigation system to transfer the user associated with the account login request to a location in the menu hierarchy associated with the location identifier.

The step of performing account login authentication may include the steps of retrieving a user account identification information associated with the location identifier, and authenticating the account login request based on the retrieved user account identification information.

A method of navigating in an interactive voice response system in accordance with still another embodiment of the present invention includes the steps of detecting an occurrence of a predetermined event, retrieving one or more accounts associated with the predetermined event, and initiating communication to a user associated with the one or more accounts.

The method in a further embodiment may also include the steps of receiving an account login request, and authenticating the account login request.

Also, in an additional embodiment, the method may include the steps of receiving a location identifier associated with the predetermined event, and directly navigating a menu hierarchy to a location corresponding to the location identifier.

The predetermined event may include one of a completion of a successful online bid, a completion of an unsuccessful online bid, an account payment reminder notification, an account update requirement notification, and a user verification notification.

A system for navigating an interactive voice response system in accordance with still yet another embodiment of the present invention includes a user terminal, and a server terminal operatively coupled to the user terminal, the server terminal configured to receive an account login request and a location identifier from the user terminal, the server terminal further configured to perform account login authentication based on the received location identifier, and bypassing one or more menu hierarchy in an interactive navigation system to transfer the user associated with the account login request to a location in the menu hierarchy associated with the location identifier.

The user terminal may include one of a telephone, a mobile telephone, a communication enabled personal digital assistant, a laptop computer, a smartphone, and a bi-directional communication enabled pager.

The server terminal may further include a storage device for storing data.

There may also be provided a CRM database operatively coupled to the server terminal, where the server terminal may be configured to store data, retrieve data, and modify stored data in the CRM database.

These and other features and advantages of the present invention will be understood upon consideration of the following detailed description of the invention and the accompanying drawings.

DETAILED DESCRIPTION

Figure 1:
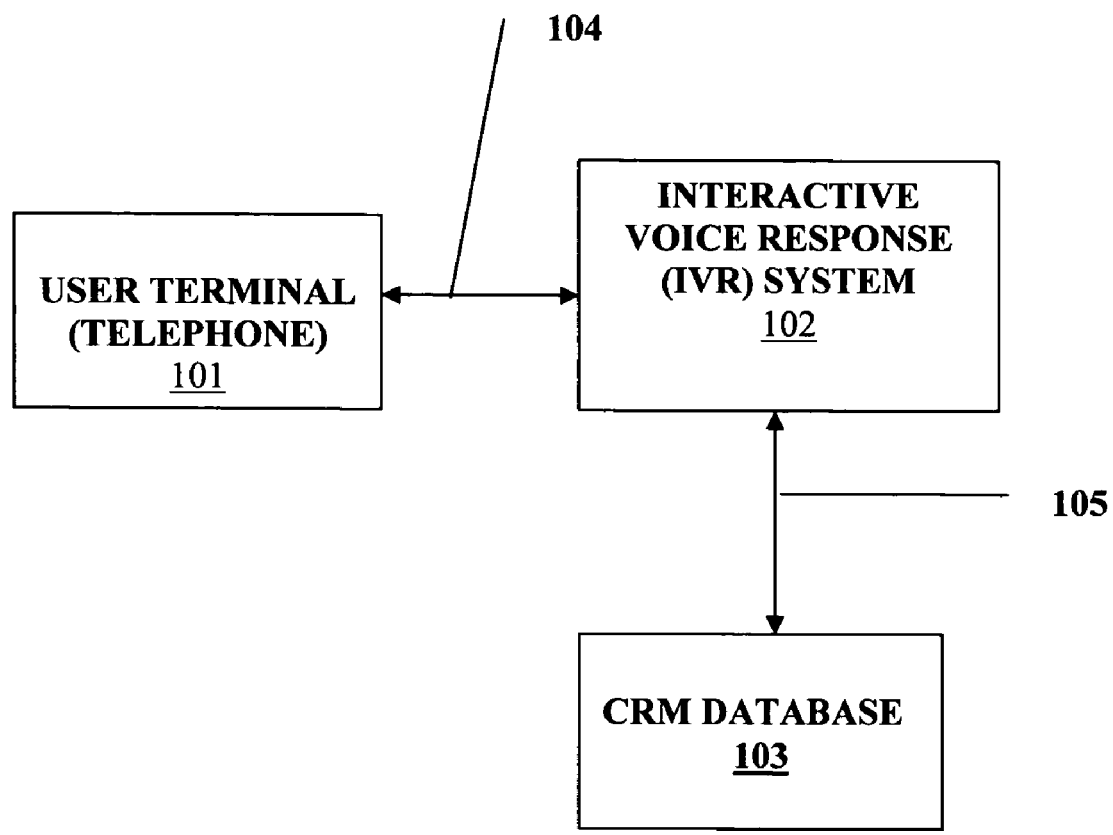
FIG. 1 illustrates a block diagram of the overall interactive voice response (IVR) system for practicing the prompt navigation in the IVR system in accordance with one embodiment of the present invention.
Figure 2:
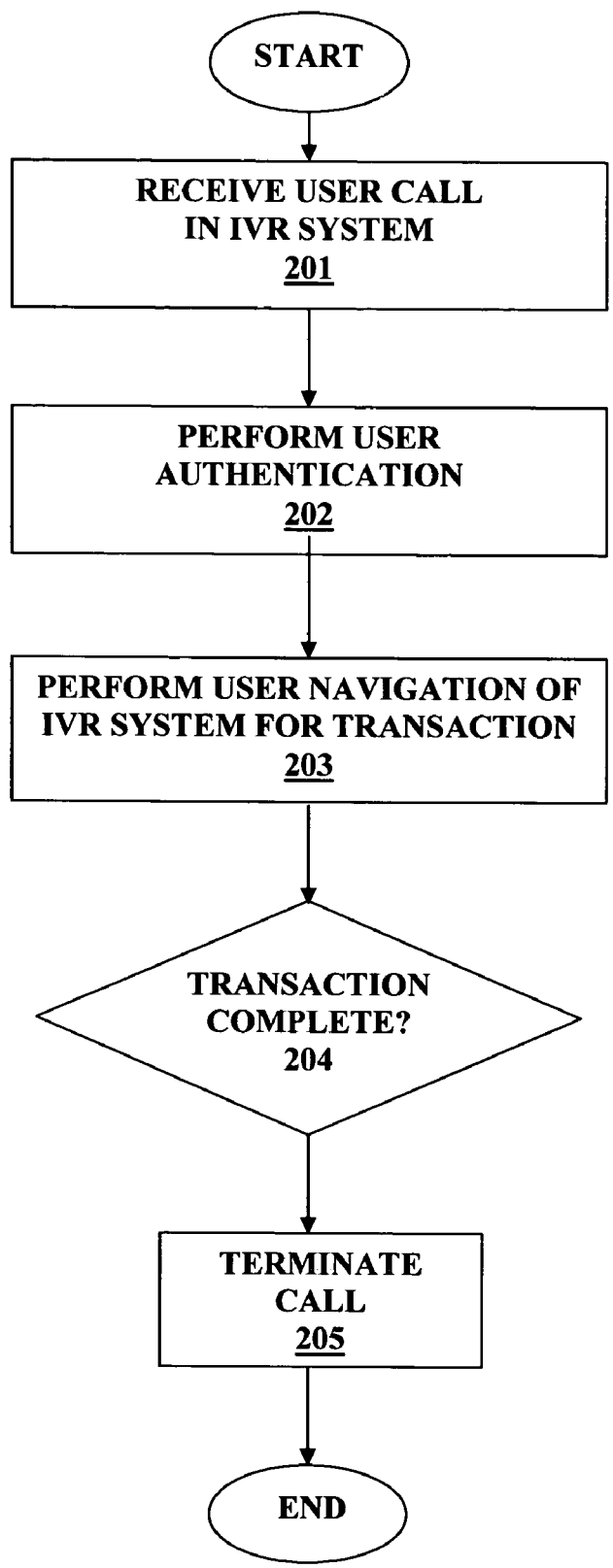
FIG. 2 is a flowchart illustrating a caller interaction with an IVR system using a telephone call.

FIG. 1 illustrates a block diagram of the overall interactive voice response (IVR) system for practicing the prompt navigation in the IVR system in accordance with one embodiment of the present invention. Referring to the Figure, in one embodiment, the overall system 100 includes an interactive voice response system 102 operatively coupled to one or more user terminals 101 via a communication link 104. The user terminals 101 include one of a POTS telephone unit, a mobile telephone unit, a personal digital assistant with wireless communication capability, and any other communication terminal configured to communicate with the IVR system 102 over a communication network via the communication link 104.

Referring to FIG. 1, the overall system 100 also includes a CRM database 103 operatively coupled to the IVR system 102 via the data link 105. In one embodiment, the CRM database 103 may be configured to store information associated with user accounts managed by the IVR system 102, and further, configured to permit the IVR system to retrieve and update the information associated with the user accounts. For example, such information may include account profile information, account login information (including login identification and password), account payment information (including payment schedule, payment history), account servicing information (such as payment method, user notification selection, and so on).

In one embodiment, the CRM database 103 may be integrated with the IVR system 102 such that the IVR system 102 includes the CRM database 103, and the data link therebetween is a secure, dedicated bi-directional data path. Furthermore, the communication link 104 between the user terminal 101 and the IVR system 102 may be a secure data path configured for transmission and reception of encrypted data.

Figure 3:
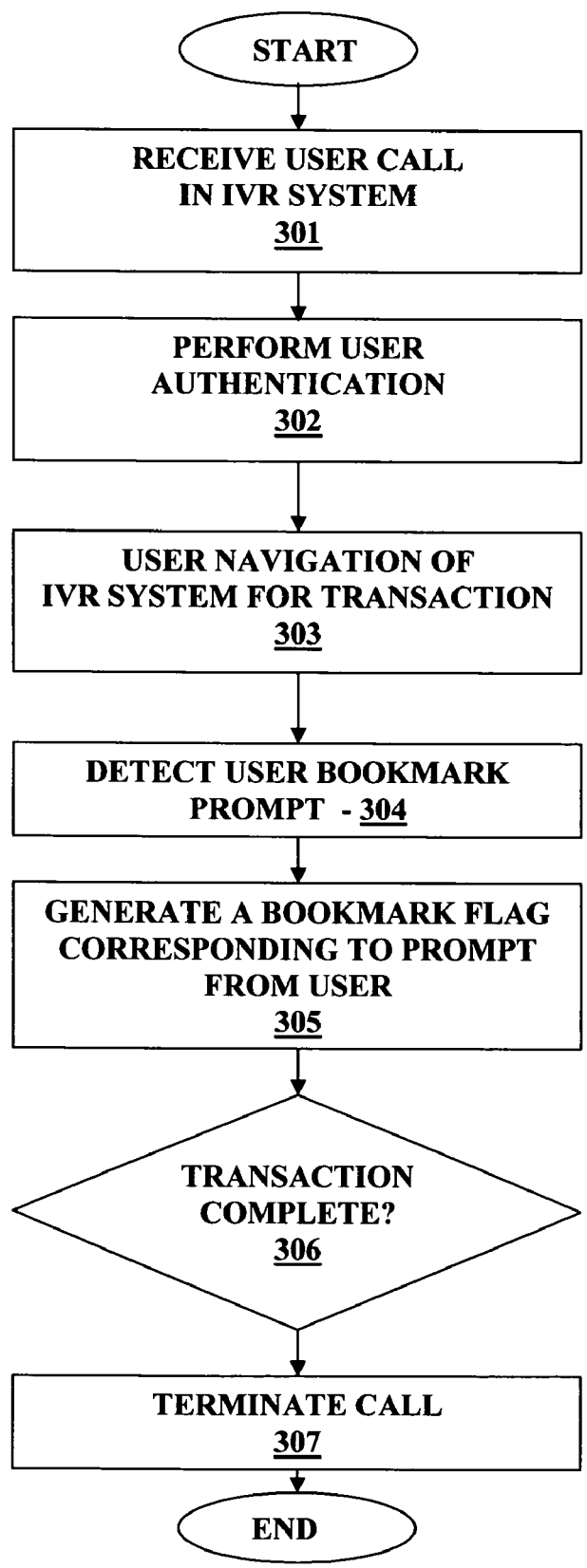
FIG. 3 is a flowchart illustrating prompt navigation during the caller interaction with an IVR system in accordance with one embodiment of the present invention.

FIG. 3 is a flowchart illustrating prompt navigation during the caller interaction with an IVR system in accordance with one embodiment of the present invention. Referring to the Figure, at step 301, the IVR system 102 is configured in one embodiment to detect a user login attempt such as by detecting the reception of a use telephone call over the communication link 104. Thereafter at step 302, the IVR system 102 is configured to perform user authentication by prompting the user to enter or input the user account login identification information and the associated password. In one embodiment, the IVR system 102 may instruct the user to enter the user account login identification information by pressing a predetermined sequence of key pads on the user telephone terminal 101. In another embodiment, the IVR system 102 may prompt the user to verbally input the user account login identification information and the password. In such a case, the IVR system 102 is configured for voice recognition.

Upon receiving the user account login identification information and the associated password from the user terminal 101, the IVR system 102 in one embodiment retrieves, from the CRM database 104, the corresponding user account information to verify the account login information received from the user terminal 101. If at step 302 the user authentication procedure fails (for example, the user inputted account login identification information and/or password does not match the corresponding account information retrieved from the CRM database 103 by the IVR system 102, then the IVR system 102 prompts the user at the user terminal 101 to reenter the login information for authentication. This procedure may be repeated for a predetermined number of times, and in the event of failure to authenticate the user based on the information received from the user terminal 101, the IVR system 102 may be configured to terminate the user call and end the procedure to ensure account access security. Furthermore, in one embodiment, such failed account access information may be stored in the CRM database 103 associated with the account, and further, optionally used to notify the account holder by a separate communication approach (paper mail or electronic mail) that several account login attempts have occurred, and that to maintain account security, to login to the account to verify access attempts.

Referring back to the Figure, upon successful user authentication at step 302, the IVR system 102 routes the user to navigate the IVR system 102 using the user terminal input device (e.g. the key pads on the user telephone) to select from various options to direct the user to the intended location in the IVR system 102 for performing the user desired transaction. For example, at each level of prompts in the IVR system 102, the user may be provided with a predetermined list of options to select from, and subsequent to the user selection, the IVR system 102 may be further configured to provide the user with additional lists of options from which to select, so as to reach the intended location within the IVR system 102.

Once the user has reached the desired location in the IVR system 102, the user may be prompted (or prompted at each level of option selection within the IVR system 102) to input a predetermined key sequence representing a bookmark entry corresponding to the location within the IVR system 102 which the user wishes to bookmark (and thus return to at a later time). For example, the IVR system 102 may prompt the user to press "##" to notify the IVR system 102 that the wishes to bookmark that particular location within the IVR system 102.

Indeed, referring back to FIG. 3, at step 304 the IVR system 102 detects the user bookmark prompt, and then at step 30, the IVR system 102 is configured to generate a bookmark flag corresponding to the prompt received from the user terminal 101. The IVR system 102 may be configured to store the bookmark flag in the CRM database 104 associated with the location of the IVR system 102 where the user has prompted the IVR system 102. Furthermore, the IVR system 102 may be configured to transmit a notification signal to the user terminal 101 confirming the user bookmark prompt and provides a bookmarked entry information for the user to use to reach the bookmarked location within the IVR system 102 during a subsequent call.

For example, the IVR system 102 in one embodiment may generate a randomized key sequence associated with the user prompted bookmark, and provides that to the user at the time the IVR system 102 generates the bookmark flag, and also, stores the randomized key sequence in the CRM database 104 associated with the user account and the bookmark flag. Indeed, the IVR system 102 may notify the user that the randomized key sequence is "#*1323" associated with the bookmarked location within the IVR system 102. In one embodiment, the IVR system 102 is configured to notify the user of the randomized key sequence when the randomized key sequence is generated and stored in the CRM database 104. Alternatively, the IVR system 102 may be configured to provide the randomized key sequence at the termination of the user call upon successfully completing the user intended transaction within the IVR system 102.

Indeed, referring to FIG. 3, at step 306, the IVR system 102 determines whether the user has completed the desired transaction (such as payment transaction, or account information retrieval etc) by prompting the user, as with one of the list of options provided by the IVR system 102 to the user terminal 101, whether the user has completed the desired transaction. If the user terminal 101 notifies the IVR system 102 that the transaction is complete at step 306, then the IVR system 307 terminates the call and the procedure ends. Also, as discussed above, the IVR system 102 may be configured to notify the user of the key sequence associated with the bookmark flag prior to the call termination at step 307 so that the user is notified of the key sequence for entry when the user interacts with the IVR system 102 at a subsequent time.

It should be noted that within the scope of the present invention, the IVR system 102 may be configured to receive a plurality of bookmark prompts during a single user call interaction from the user terminal 101. As such, the IVR system may be configured to generate a plurality of discrete randomized key sequences each uniquely identifying a separate location within the IVR system 102, and further, each of which is provided to the user for use during a subsequent interaction with the IVR system 102.

Additionally, within the scope of the invention, the user terminal 101 may be configured to terminate the call in which case, the IVR system 102 detects a call termination signal received from the user terminal 101, and terminates the user call, thus completing the procedure.

Figure 4:
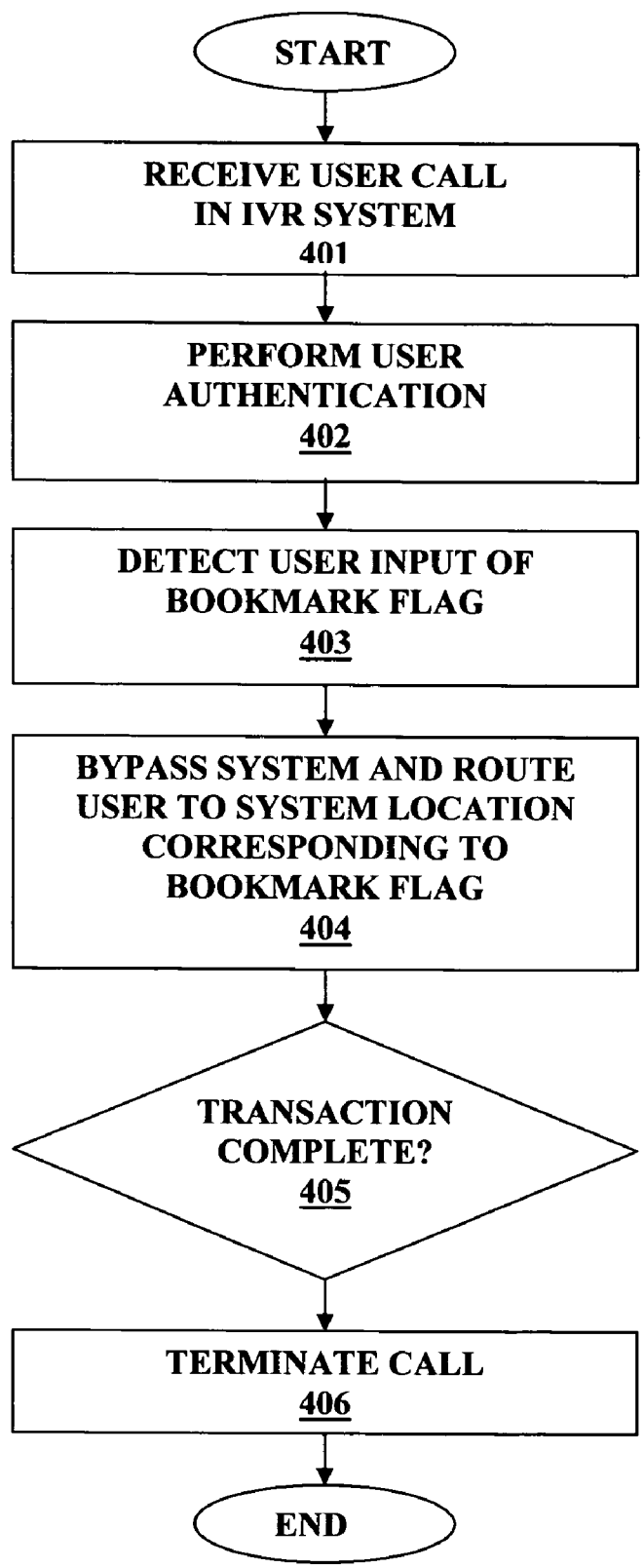
FIG. 4 is a flowchart illustrating prompt navigation during the caller interaction with an IVR system in accordance with another embodiment of the present invention.

FIG. 4 is a flowchart illustrating prompt navigation during the caller interaction with an IVR system in accordance with another embodiment of the present invention. Referring to the Figure, at steps 401 and 402, the IVR system 102 receives the user calling into the IVR system 102 and performs the user authentication similar to the steps performed in conjunction with steps 301 and 302 of FIG. 3. Referring back to FIG. 4, at step 403, after successfully completing the user authentication and login into the IVR system 102, the IVR system 102 detects the user input of the key sequence associated with the bookmark. For example, the user, desiring to reach the same location within the IVR system 102 and wishing to bypass the initial stages of the IVR system hierarchy to reach the bookmarked location in the IVR system 102, inputs the key sequence previously received from the IVR system 102. In one embodiment, the IVR system 102 may prompt the user to input the key sequence for the bookmarks that the user wishes to reach at any time during the user initiated call. Alternatively, the IVR system 102 may be configured to provide the user option to enter the key sequence initially as one of the options in the list of predetermined options from which the user may select.

Then, at step 404, the IVR system 102 verifies the key sequence received with the associated bookmark flag stored in the CRM database 104, and upon verification, bypasses the IVR system hierarchy, and routes the user call to the bookmarked system location corresponding to the key sequence received from the user terminal 101. Thereafter, the user may perform the desired transaction at the bookmarked location within the IVR system 102, and upon determination of completed user transaction at step 405, the system terminates the call at step 406 and the procedure ends, similar to the steps 306 and 307 in FIG. 3.

As can be seen, in this embodiment, the user is able to bypass through the hierarchy of options in the IVR system 102 by entering the key sequence associated with the previously provided bookmark representing a location within the IVR system 102 which the user wishes to be directed to. In this manner, the user is able to efficiently navigate through the IVR system 102, especially for repeat transactions, and can easily bypass unnecessary steps and options within the IVR system 102.

Figure 5:
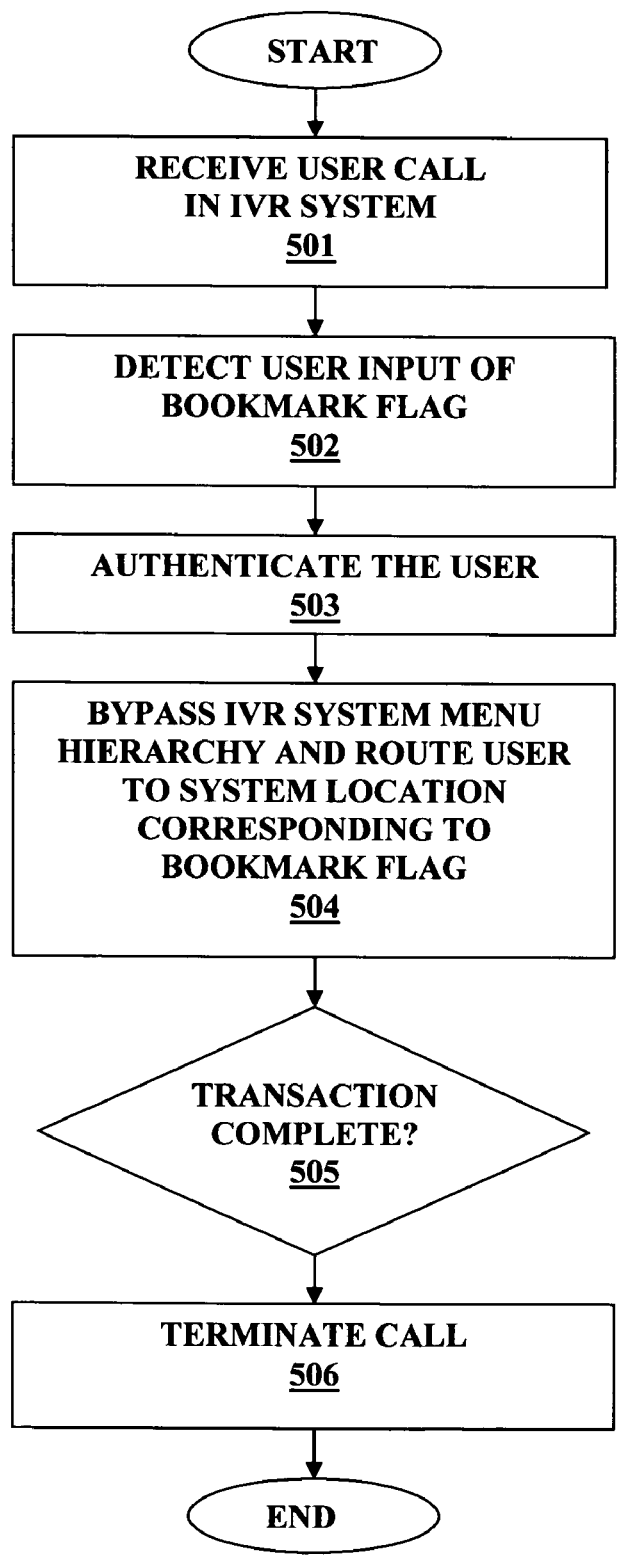
FIG. 5 is a flowchart illustrating prompt navigation during the caller interaction with an IVR system in accordance with yet another embodiment of the present invention.

FIG. 5 is a flowchart illustrating prompt navigation during the caller interaction with an IVR system in accordance with yet another embodiment of the present invention. Referring to FIG. 5, at step 501, the IVR system 102 detects and receives a user call from the user terminal 101. Thereafter, at step 502, the IVR system 102 detects the user input of the key sequence associated with the user bookmark corresponding to the user desired location within the IVR system 102. In one embodiment, the IVR system 102 may initially prompt the user to input any key sequence associated with a bookmark as an option upon receiving the user call in the IVR system 102 at step 501.

Referring to FIG. 5, upon receiving the key sequence a step 502, the IVR system 102 prompts the user to enter the user login identification information and the associated password in order to permit the user access into the IVR system. Upon successful user authentication, by for example, comparing the received user account login identification data and the password with the account information stored in the CRM database 104, the user is successfully logged into the IVR system 102 for navigation.

Upon successfully completing the authentication of the user, at step 504, the IVR system 102 menu hierarchy is bypassed and the user is routed to the system location corresponding to the key sequence that matches the bookmark flag stored in the CRM database 104. Thereafter, similar to steps 405 and 406 of FIG. 4, at step 505, the IVR determines that the user has completed the desired transaction, and subsequent thereto, at step 506, the call is terminated.

Accordingly, by using the key sequence associated with the bookmark, the user may be conveniently be logged into the IVR system and, upon successful authentication, routed to the bookmarked location within the IVR system 102 to perform the intended transaction.

Figure 6:
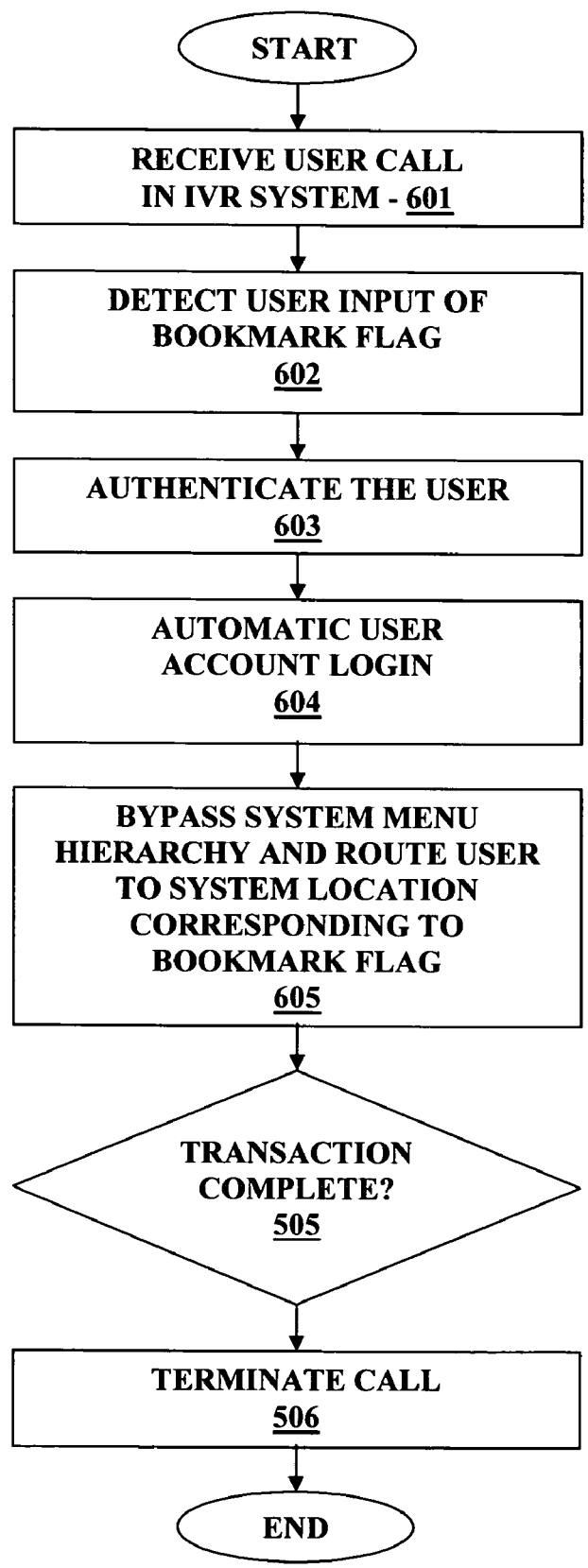
FIG. 6 is a flowchart illustrating prompt navigation during the caller interaction with an IVR system in accordance with still another embodiment of the present invention.

FIG. 6 is a flowchart illustrating prompt navigation during the caller interaction with an IVR system in accordance with still another embodiment of the present invention. Referring to FIG. 6, at step 601, the IVR system 102 receives the user call, and at step 602, detects the user input of the key sequence associated with the user bookmark within the IVR system 102. As can be seen, steps 601 and 602 are similar to the procedures associated with steps 501 and 502 of the embodiment shown in FIG. 5. Referring back to FIG. 6, in one embodiment, at step 603, the IVR system 102 is configured to retrieve from the CRM database 104 the user account login identification information and the associated password corresponding to the user account that is associated with the key sequence received from the user terminal 101. Thereafter at step 604, the IVR system 102 automatically authenticates the user's call based on the retrieved user account login identification and password information, and at step 605, bypasses the menu hierarchy of the IVR system 102 to route the user to the bookmarked location corresponding to the key sequence received from the user within the IVR system 104.

In this manner, in one embodiment, the IVR system 102 may be configured to automatically authenticate the user to login the user into the IVR system 102 based on the user's input of the key sequence associated with the user-inputted bookmark request during a prior IVR system interaction and navigation.

Indeed, in accordance with one embodiment, the user may be automatically authenticated and logged into the WR system 102 based on the user's input of the key sequence associated with the bookmarked location within the IVR system 102, rather than having to separately provide login information at the beginning of the call into the IVR system 102, and thereafter, navigating through each layer of the menu hierarchy of the IVR system 102 to reach the desired location in the IVR system 102.

Referring back to FIG. 6, upon successful login and routing of the user to the bookmarked location within the IVR system 102, at step 606 the IVR system 102 performs the appropriate transaction based on the user input at the bookmarked location, when it is determined that the transaction is completed, the call is terminated. As can be seen, steps 605 and 606 of the embodiment shown in FIG. 6 is substantially similar to the steps 505 and 506, respectively, of the embodiment shown in FIG. 5.

Figure 7:
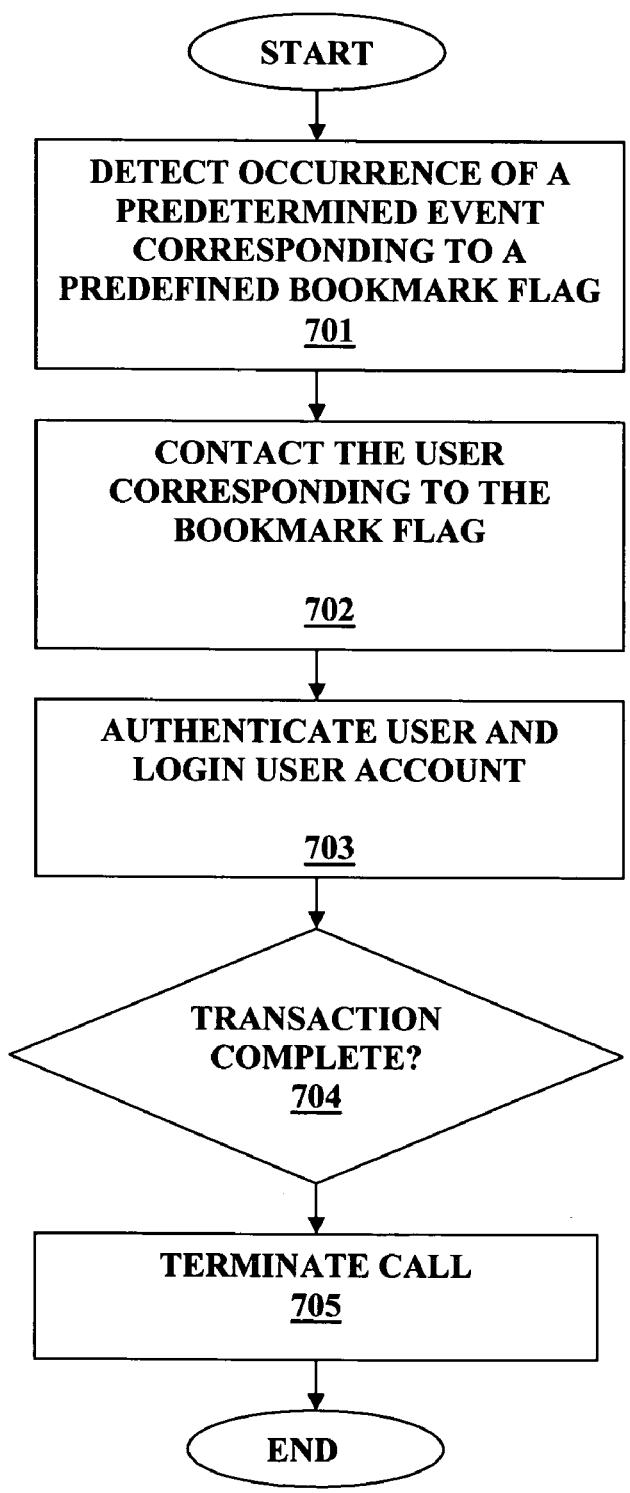
FIG. 7 is a flowchart illustrating user notification to initiate the interaction with the IVR system in accordance with one embodiment of the present invention.

FIG. 7 is a flowchart illustrating user notification to initiate the interaction with the IVR system in accordance with one embodiment of the present invention. Referring to the FIG. 7, at step 701, the IVR system 102 detects the occurrence of a predetermined event that corresponds to a predefined bookmark entered by the user during a prior transaction. In one embodiment, the occurrence of the predetermined event may be, for example, the approaching due date for a recurring payment schedule. In such an example, the user, during a prior call into the IVR system 102 has bookmarked the payment transaction location within the IVR system 102, and the IVR system 102 is configured to notify the user within a predefined time period of the approaching payment deadline.

Referring back to FIG. 7, at step 702, the IVR system 102 is configured to contact the user terminal 101 associated with the account corresponding to the occurrence of the predetermined event. In this case, by way of an example, the IVR system 102 may be configured to call the user terminal 101. Thereafter, at step 703, the IVR system may prompt the user to provide user account login identification information and password in order to authenticate the user. Upon successful authentication, at step 704, the IVR detects the completion of the user transaction and thus, terminates the call at step 705.

In this embodiment, as can be seen from the Figure, the IVR system 102 is configured to notify the user to login and perform the desired transaction based on a predetermined occurrence of an event that the user has specified and associated with the transaction corresponding to the bookmarked location of the IVR system menu hierarchy For example, the predetermined events may include a payment due date notification, an online auction bid successful notification, an online bid unsuccessful notification, a change in associated bank account reminder (for example, insufficient funds), and the like. In one embodiment, the user may specify the IVR system 102 during the initial navigation and bookmarking as to when the user wishes to be notified by the IVR system 102 for the associated transaction. Alternatively, the IVR system 102 may be configured to generate a notification reminder prompt to the user to establish the occurrence or period of notification corresponding to the predetermined event associated with the bookmarked transaction. In this manner, the user may be conveniently notified by the IVR system 102.

Within the scope of the present invention, the IVR system 102 may be configured to maintain the key sequence validity in the event of a modification in the IVR system menu hierarchy. Indeed, so long as the associated transaction or prompt within the IVR system 102 is valid, the stored key sequence associated with the bookmark flag is maintained to be valid. Furthermore, the IVR system 102 may be configured to update the data and information associated with the user account in the CRM database 104 so that with each call or transaction, the IVR system 102 is configured to store any information that is newly received from the user terminal 101, or which modifies the stored data associated with the user.

The various processes described above including the processes performed by the IVR system 102 in the software application execution environment in the overall system 100 including the processes and routines described in conjunction with FIGS. 3-7, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the IVR system 102 may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of navigating in an interactive voice response system, the method comprising the steps of:
   detecting an account login request;
   receiving a location identifier;
   performing account login authentication based on the received location identifier: and
   bypassing one or more menu hierarchy in an interactive navigation system to transfer the user associated with the account login request to a location in the menu hierarchy associated with the location identifier.

2. The method of claim 1 wherein the step of performing account login authentication includes the steps of:
   retrieving a user account information associated with the location identifier; and
   authenticating the account login request based on the retrieved user account information.

3. The method of claim 2 wherein the user account information includes one or more of a user account identification information, a user account password information, a user account transaction information, a user account billing information, a user account payment information, a user profile information, a user account demographic information, and a user account payment history information.

4. A system for navigating an interactive voice response system, comprising:
   a user terminal;
   a server terminal operatively coupled to the user terminal, the server terminal configured to receive an account login request and a location identifier from the user terminal, the server terminal further configured to perform account login authentication based on the received location identifier, and bypassing one or more menu hierarchy in an interactive navigation system to transfer the user associated with the account login request to a location in the menu hierarchy associated with the location identifier.

5. The system of claim 4 wherein the user terminal includes one of a telephone, a mobile telephone, a communication enabled personal digital assistant, a laptop computer, a smartphone, and a bi-directional communication enabled pager.

6. The system of claim 4 wherein the server terminal further includes a storage device for storing data associated with the account login request.

7. The system of claim 4 further including a CRM database operatively coupled the server terminal, the server terminal configured to store data, retrieve data, and modify stored data in the CRM database.

* * * * *